United States Patent [19]
Hamby, Jr.

[11] Patent Number: 5,515,895
[45] Date of Patent: May 14, 1996

[54] TREE DELIMBLING DEVICE WITH SELF-ALIGNING CUTTER HEAD ASSEMBLY

[76] Inventor: Thomas E. Hamby, Jr., 1776 Arbor Grove Church Rd., Purlear, N.C. 28665

[21] Appl. No.: 399,432

[22] Filed: Mar. 7, 1995

[51] Int. Cl.⁶ .............................. A01G 23/00; B27L 1/00
[52] U.S. Cl. ..................... 144/24.13; 144/335; 144/343; 144/208.8
[58] Field of Search ................................... 144/2 Z, 3 D, 144/208 E, 33 S, 340, 343

[56] References Cited

U.S. PATENT DOCUMENTS

| | | |
|---|---|---|
| 3,183,949 | 5/1965 | Larson . |
| 3,398,774 | 8/1968 | Hahn . |
| 3,443,611 | 5/1969 | Jorgensen . |
| 3,572,410 | 3/1971 | McElderry . |
| 3,596,690 | 8/1971 | Hamilton et al. . |
| 3,643,708 | 2/1972 | Lindblom . |
| 3,690,351 | 9/1972 | Strickland et al. . |
| 3,735,786 | 5/1973 | Vit . |
| 3,763,904 | 10/1973 | Eynon . |
| 3,797,539 | 3/1974 | Moser et al. . |
| 3,809,134 | 5/1974 | McCabe . |
| 3,881,532 | 5/1975 | Jouppi . |
| 3,905,407 | 9/1975 | Guy et al. . |
| 3,974,866 | 8/1976 | Saarenketo . |
| 3,981,336 | 9/1976 | Levesque . |
| 4,034,785 | 7/1977 | Tucek . |
| 4,049,032 | 9/1977 | Oldenburg et al. . |
| 4,050,486 | 9/1977 | Whitcomb . |
| 4,083,463 | 4/1978 | Ericsson . |
| 4,114,666 | 9/1978 | Bruun . |
| 4,116,249 | 9/1978 | Hogberg et al. . |
| 4,124,047 | 11/1978 | Dressler et al. . |
| 4,194,542 | 3/1980 | Eriksson . |
| 4,250,935 | 2/1981 | Helgesson et al. . |
| 4,258,762 | 3/1981 | Belanger . |
| 4,298,042 | 11/1981 | Peltola ................................... 144/2 Z |
| 4,462,438 | 7/1984 | Gandreault . |
| 4,569,379 | 2/1986 | Gemmell-Murdoch . |
| 4,620,578 | 11/1986 | Verrill et al. . |
| 4,742,854 | 5/1988 | Forslund . |
| 4,749,012 | 6/1988 | Hamby, Jr. . |
| 4,766,939 | 8/1988 | Forslund . |
| 4,815,506 | 3/1989 | Kainz . |
| 4,899,794 | 2/1990 | Hamby, Jr. . |
| 5,097,881 | 3/1992 | Mack . |

FOREIGN PATENT DOCUMENTS

343391  6/1972  Sweden .

Primary Examiner—W. Donald Bray
Attorney, Agent, or Firm—Bell, Seltzer, Park & Gibson

[57] ABSTRACT

There is provided a tree delimbing cutter head assembly with improved self-aligning cutter head including a rectangular support frame, pivotally mounted cutting and limb stripping levers and guide means, frame support means that provide rotational and pivotal movement and an improved resilient assembly for returning the rectangular support frame to a centered position after completion of a delimbing operation. There is also provided a tree bole diameter measuring assembly used in connection with the delimber.

8 Claims, 5 Drawing Sheets

TREE DELIMBLING DEVICE WITH SELF-ALIGNING CUTTER HEAD ASSEMBLY

BACKGROUND OF THE INVENTION

Field of the Invention

The present invention relates to a tree delimber with a self-aligning cutter head assembly. More particularly, this invention relates to a tree delimber having delimbing blades in encircling engagement with a tree bole so that the blades are automatically maintained parallel with the longitudinal axis of the tree as the bole is pulled through the cutter head and to an improvement for measuring the diameter of a tree bole.

The Prior Art

Delimbing trees by encircling the tree bole with cutting blades and moving the blades along the length of the tree is known. For example, the delimbing device may form a part of a tree harvester and is supported for vertical movement on a track. One such delimbing device is disclosed in U.S. Pat. No. 3,183,949 and moves upward along a track adjacent a standing tree to remove the limbs. In U.S. Pat. No. 3,443,611 a telescopic boom on which the delimbing device is attached moves the delimber along the length of the tree while the top of the tree is held by the inner-most portion of the telescopic boom.

Another type of delimbing device is supported in a horizontal position and moves along a track while the tree is held in a horizontal position. Examples of such a tree delimbing apparatus are disclosed in U.S. Pat. Nos. 3,905,407 and 4,462,438.

Yet another type of tree delimber is disclosed in U.S. Pat. Nos. 3,398,774 and 4,258,762 wherein the limb cutting head assembly is fixed in a horizontal position on a frame. The tree is then longitudinally pulled through the cutting head assembly by gripping jaws which are supported for movement along a horizontal track. The tree harvesters and delimbers of these types are very large and expensive and involve complicated mechanisms which are difficult to maintain in proper operating condition. Also, it is often difficult or even impossible to maneuver such large equipment into position adjacent the particular trees to be delimbed and harvested, particularly in hilly and rough terrain.

In U.S. Pat. No. 4,749,012 there is disclosed a self-aligning cutter head assembly for delimbing trees in which curved cutting and limb stripping blades are carried by a support frame supported for pivotal movement in both vertical and horizontal planes so that the limb stripping blades are automatically maintained parallel with the longitudinal axis of the tree as the tree is pulled through the cutter head assembly by the grapple head of a knuckle boom loader. In this device, the pivotal support in both the vertical and horizontal planes for the support frame is provided by a "fifth wheel" connection in which both the pivot pins for providing vertical and horizontal movement are spaced close together and are both positioned beneath the rectangular frame. A chain assembly provides means for limiting pivot movement in the horizontal plane and automatically returns the support frame to a centered position.

If axial alignment is not accurately maintained as the tree is drawn past the engaged delimbing blades, the blades will dig into and cut the side of the tree bole. When the blades dig into the tree bole, the operator must reverse the direction of movement of the tree bole to free the blades and then continue to pull the tree through the delimber while maintaining accurate longitudinal axial alignment with the delimbing blades.

It is desirable to get the maximum amount of usable wood from a tree, i.e., delimb the tree to a bole diameter of about 4". Many harvesting operations judge by eye or manually measure the bole diameter. As the grapple pulls the bole through the delimber the topping saw is manually activated upon the operator's command.

It is therefore an object of the present invention to provide a tree delimber having an improved self-aligning cutter head assembly which is simple in construction, inexpensive to manufacture and maintain.

Another object of the present invention is to provide an improved self-aligning cutter head assembly which is particularly adapted for use in conjunction with a knuckle boom loader for drawing a tree bole in a longitudinal direction through the cutter head assembly without requiring the knuckle boom load operator to maintain accurate longitudinal axial alignment with the cutter head assembly.

A further object of the present invention is to provide a device for automatically topping the bole at a predetermined diameter.

Still another object of the present invention is to provide a self-aligning cutter head assembly with improved position of the hydraulic lines.

Yet another object of the present invention is to provide a self-aligning cutter head assembly capable of being variously located relative to the vertical pivot area to provide the desired balance of the cutter head.

SUMMARY OF THE INVENTION

In accordance with the present invention, these and other objects, features and advantages are achieved by the embodiments illustrated herein by the provision of a tree delimbing device with an improved self-aligning cutter head assembly mounted to an extension of a knuckle boom loader. The cutter head assembly includes a rectangular support frame with a pair of curved cutting and limb stripping blades pivotally supported for movement toward and away from each other and adjacent one end of the rectangular support frame. The pivotal curved stripping blades, along with a fixed curved blade, define a tree encircling opening therebetween for longitudinal movement of a tree in one direction through the cutting opening. Additionally, curved guide levers are pivotally supported for movement toward and away from each other and adjacent the other end of the rectangular support frame with the guide levers defining a tree encircling guide opening therebetween for axial movement of the tree trunk through the guide opening.

The rectangular support frame, mounted to a rotational frame mounting plate, provides a limited amount of movement in both vertical and horizontal planes. Rotational movement to the rotational mounting plate is provided by a rotational bearing member and horizontal movement is provided by a pivot. The combination of rotational and pivotable movement act to cause the support frame and the curved stripping blades and guide levers to be maintained in alignment with the tree bole as the tree is drawn through the respective cutting and guiding openings at opposite ends of the rectangular support frame. This mounting of the rectangular support frame for pivotal movement in both vertical and horizontal planes provides the self-aligning feature for the cutter head assembly and automatically maintains the limb stripping blades in axial alignment with the tree as it is drawn therethrough so that axial alignment of the cutter head is not dependent upon the skill of the operator of the knuckle boom loader.

The curved limb stripping blades and the curved guide levers are urged inwardly into tree encircling engagement with the tree trunk as the diameter of the tree bole reduces when the tree is drawn through the cutter head assembly from the butt direction. Hydraulic cylinders operate to open the curved limb stripping blades and the curved guide levers for initial receipt of the tree therein. A gear train drivingly interconnects the curved limb stripping blades and the curved guide levers to insure equal inward and outward pivoting movement of each of these elements of the cutter head assembly. The stripping blade pivot shafts have a series of different sized cams located thereon and interconnected to a series of microswitches wired to a light bar which indicates by flashing different colored lights the diameter of the tree bole.

The operation of the hydraulic cylinders for moving the curved limb stripping blades and the curved guide levers to the open position are operated from the hydraulic pump normally provided on the knuckle boom loader. Hydraulic pressure supply lines which are easily connectable between the pump and the cylinders and a simple operating lever is positioned on the knuckle boom loader for easy access by the operator.

A chain assembly comprising a chain having an additional chain segment attached thereto and a spring located in the main chain section is connected between the rectangular support frame, the support for the cutter head assembly and the frame structure to limit the amount of horizontal rotation of the rectangular support frame so that the cutter head assembly is returned to and maintained in a substantially centered position after the completion of each delimbing operation. The chain assembly also provides for limiting the amount of pivotal movement and also stops rotation of the rectangular support frame in the vertical plane so that the cutter head assembly is returned to and maintained in substantially a horizontal position following each delimbing operation. Thus, the cutter head assembly is conveniently positioned to receive a tree therein following each delimbing operation. Rotational movement of the cutter head assembly is facilitated by a pair of roller bearings located at the rear of the support frame.

BRIEF DESCRIPTION OF THE DRAWINGS

Other objects, features and advantages of the invention will be apparent from the detailed description of the invention when taken in conjunction with the accompanying drawing, in which.

DESCRIPTION OF THE PREFERRED EMBODIMENTS

Figure 1:
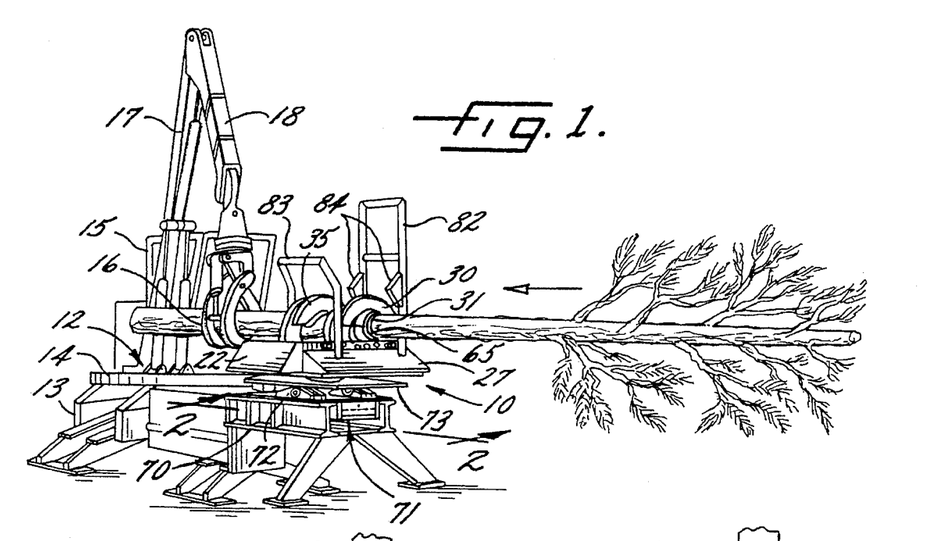
FIG. 1 is a perspective view of the tree delimber supported on one end of a knuckle boom loader and illustrating a tree bole being pulled through the cutter head assembly by the grapple of the knuckle boom loader.

In accordance with the present invention there is provided a self-aligning cutter head assembly, broadly indicated at 10, of the present tree delimber which is supported on an extension of one end of a knuckle boom loader 12. The knuckle boom loader 12 may be of any suitable type and includes a lower frame 13 supporting a pivotal platform 14 on which is mounted a suitable operator enclosure 15 and a boom, including crane arms 17, 18 supporting a grapple 16 on the outer end thereof. The crane arms 17, 18 are operated in the usual manner by means of hydraulic cylinders (not shown).

The knuckle boom loader 12 is normally employed to lift felled and delimbed trees to either cut them in predetermined lengths and place them on a truck for transportation. The trees are normally skidded or dragged from the forest to a point adjacent the knuckle boom loader 12 cut therefrom in the woods by a hand chain saw and are piled in a convenient location adjacent the knuckle boom loader 12. By providing the self-aligning cutter head assembly 10 on the knuckle boom loader 12, the operator can carry out the delimbing operation in an efficient and economical manner by simply drawing the tree through the cutter head assembly after the tree is lifted from the stack of trees to be loaded. A length of the tree bole is delimbed until the desired bole diameter is reached and the topping saw is activated by the knuckle boom loader operator. The delimbed tree bole is then loaded on a truck.

Figure 2:
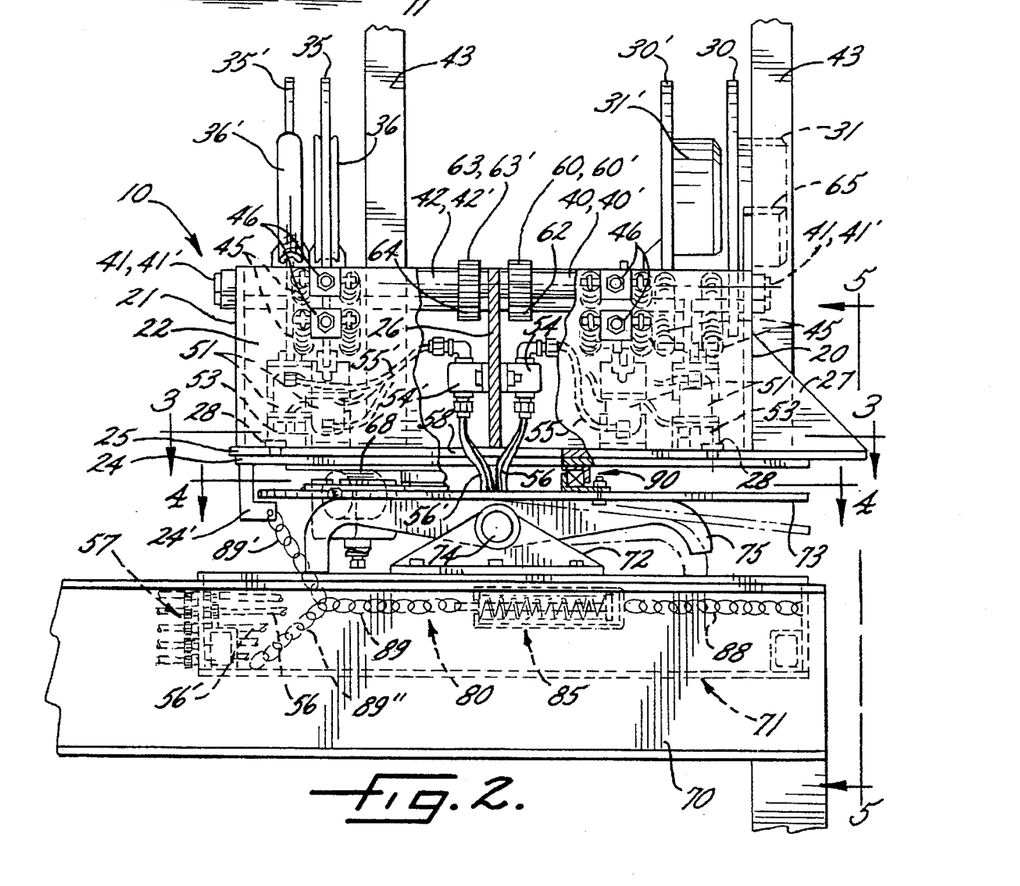
FIG. 2 is a fragmentary side elevation view of the rectangular support frame taken generally along line 2—2 of FIG. 1, illustrating the manner in which the same is pivotally supported at one end of the frame of the knuckle boom loader.
Figure 3:
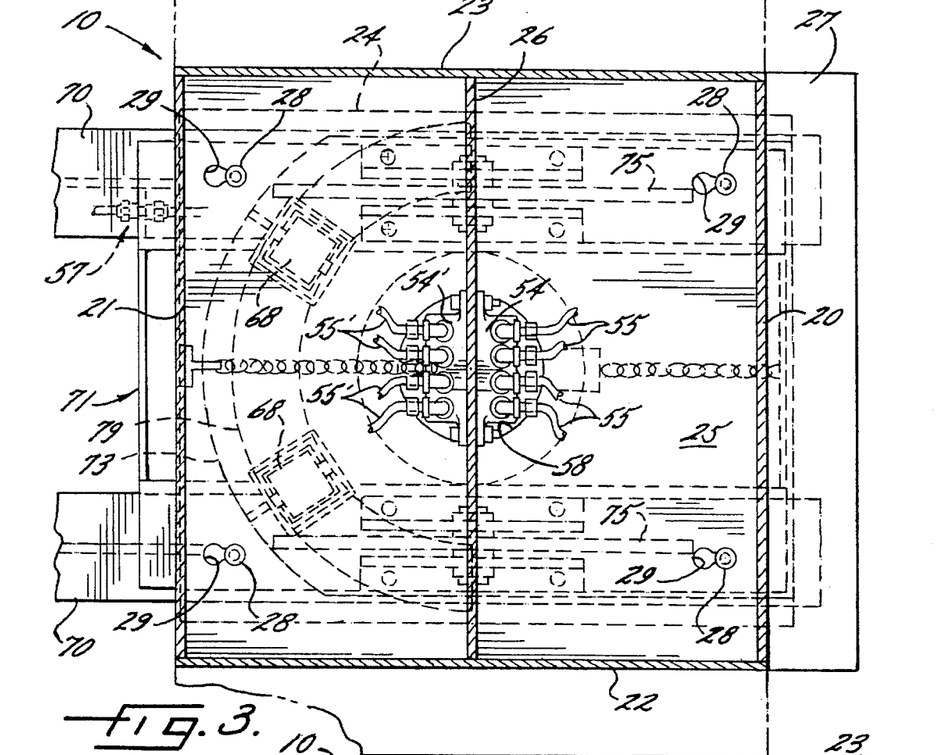
FIG. 3 is a top view of the pivot support structure taken along line 3—3 of FIG. 2.

The self-aligning cutter head 10 may be of the general type as disclosed in U.S. Pat. No. 4,749,012, incorporated herein by reference. As shown in FIG. 2, the cutter head 10 includes a rectangular support frame with respective front and rear walls 20, 21 opposite outwardly inclined side walls 22, 23 (FIG. 5), a bottom support plate 25, and a central vertically positioned support wall 26 extending across and suitably connected at opposite ends to opposite walls 22, 23. The front wall 20 is provided with a downwardly slanting limb deflecting shield 27. The rectangular frame support of cutter head 10 is removably attached by retaining knobs 28 to rotational frame mounting plate 24 through key-type holes 29 in bottom plate 25.

Curved cutting and limb stripping levers 30, 30' are pivotally supported adjacent their lower ends for movement toward and away from each other and adjacent the front end 20 of the rectangular support frame. As shown in FIG. 2, the curved cutting and limb stripping levers 30, 30' have respectively curved blades 31, 31' fixed to their inner curved surfaces and collectively define a tree encircling cutting opening therebetween for longitudinal movement of the tree bole in one direction through the cutting opening. To delimb the underside of the tree bole a curved fixed blade 65 is fixed on and extends upwardly above front wall 20. The fixed blade 65 cooperates with the curved blades 30, 30' to encircle the tree bole and complete the cutting opening through which the tree bole passes. Guide means, in the form of curved tree guide lever 35, 35' are pivotally supported adjacent their lower ends for movement toward and away from each other and adjacent the rear end 21 of the support frame. The inner curved surfaces of the guide levers 35, 35' are provided with respective curved guide plates 36, 36' and collectively define a tree encircling guide opening therebetween for axial movement of the tree bole through the guide opening.

The lower end portions of the curved limb stripping levers 30, 30' are fixed on respective tubular sleeve members 40, 40', supported for rotational movement on the respective support shafts 41, 41' which extend through and are supported in the front wall 20, the rear wall 21, and the intermediate support wall 26. The lower end portions of the guide levers 35, 35' are fixed on respective tubular sleeve members 42, 42', supported for rotation on the rear portions of the support shafts 41, 41'.

The limb stripping levers 30, 30', as well as the curved guide levers 35, 35', are resiliently urged toward each other by sets of upper and lower tensions springs 45, the outer ends of which are connected to spring attachment members 46 which extend outwardly through the respective opposite side walls 22, 23 and are threaded to receive an adjustment nut thereon. Thus, the threaded outer ends of the spring attachment members 46 provide means for adjusting the tension of the tension springs normally urging the stripping levers 30, 30' and the guide levers 35, 35' inwardly toward each other in surrounding and encircling relationship with the tree bole. The inner ends of the sets of tensions springs 45 are fixed to a yoke plate (not shown) which is in turn supported on a horizontally extending operating pin (not shown). The operating pin is connected to the tubular sleeve 40 via an auxiliary arm.

The limb stripping levers 30, 30' and the guide levers 35, 35' are moved outwardly away from each other to the open position by corresponding hydraulic cylinders 51 provided with operating piston rods (not shown). The outer ends of the hydraulic cylinders 51 are pivotally supported on support brackets 53 fixed on the opposite sides walls 22, 23 and the inner ends of the piston rods are connected via a sprocket chain to the operating pin. The hydraulic cylinders 51 are connected to hydraulic supply lines 55, 55' which are connected to hydraulic manifolds 54, 54'. Hydraulic supply lines 56, 56' extend from the respective manifolds 54, 54' through openings 58, 59 (FIG. 8) in bottom support plate 25, rotational frame mounting plate 24, respectively, and along frame extension 70 to hydraulic line connector plate 57. Additional hydraulic lines (not shown) serve to make connections to the knuckle boom loader 12 and are operated by a suitable manual valve controlled by the knuckle boom loader operator in preparation for positioning a tree bole in the cutter head assembly 10 for the delimbing step.

To insure uniform inward and outward movement of the stripping levers 30, 30', respective spur gears 60, 60' are fixed on each of the tubular sleeve members 40, 40' and positioned adjacent the intermediate support wall 26 as shown in FIG. 2. The spur gears 60, 60' are drivingly interconnected by a pair of idler spur gears 62. Spur gears 63, 63' are fixed on the sleeves of members 42, 42' and are drivingly interconnected by idler spur gears 64 similar to the idler spur gears 60. The spur gears 63, 63' insure uniform inward and outward movement of the guide levers 35, 35'.

In accordance with the present invention, improved means are provided for supporting and controlling the support frame for rotational and pivotal movement in both the vertical and horizontal planes so that the support frame, along with the limb stripping blades 31, 31' and the guide levers 35, 35' are maintained in alignment with the longitudinal axis of the tree bole as the bole is drawn through the respective cutting guiding means at the respective front and rear end of the support frame by the grapple 16 of the knuckle boom loader 12.

Figure 5:
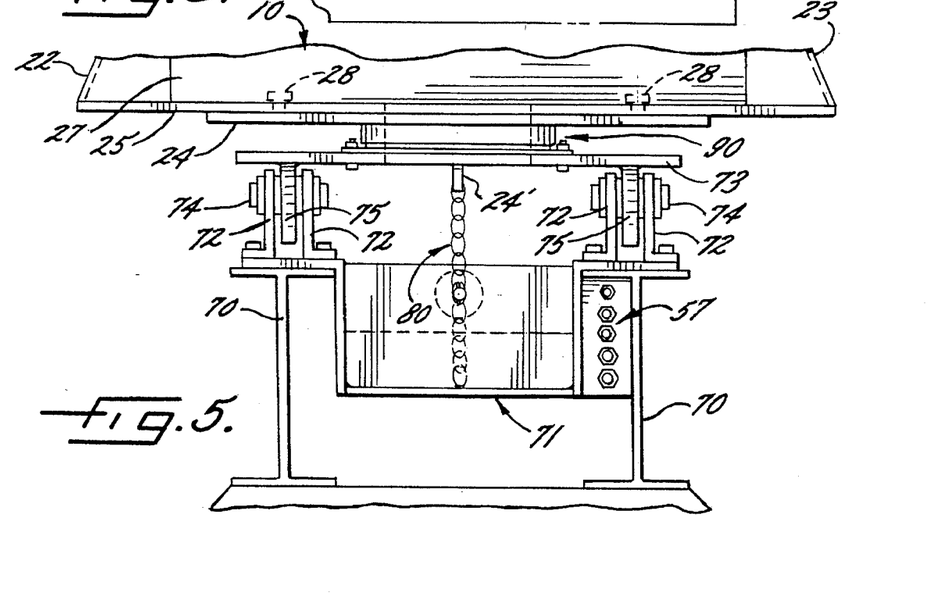
FIG. 5 is a frontal elevation view of the rotational member, pivot, and depending frame structure taken generally along line 5—5 of FIG. 2.

As illustrated in FIG. 5, the cutter head assembly 10 is supported on a frame extension 70 of the knuckle boom leader 12 by means of rotational bearing member 90 including base support brackets 72 fixed on the frame extension 70 and a pivot plate 73 pivotally connected to the base brackets 72 through vertical stop member 75 as by pivot pin 74 to provide pivotal movement of the pivot plate 73 in a vertical plane. The amount of pivotal movement in the vertical plane is limited by the shape and length of vertical stop member 75. To insure proper weight balance of the cutter head assembly 10 the placement of pivot pin 74 through vertical stop member 75 may be varied along its length.

Figure 4:
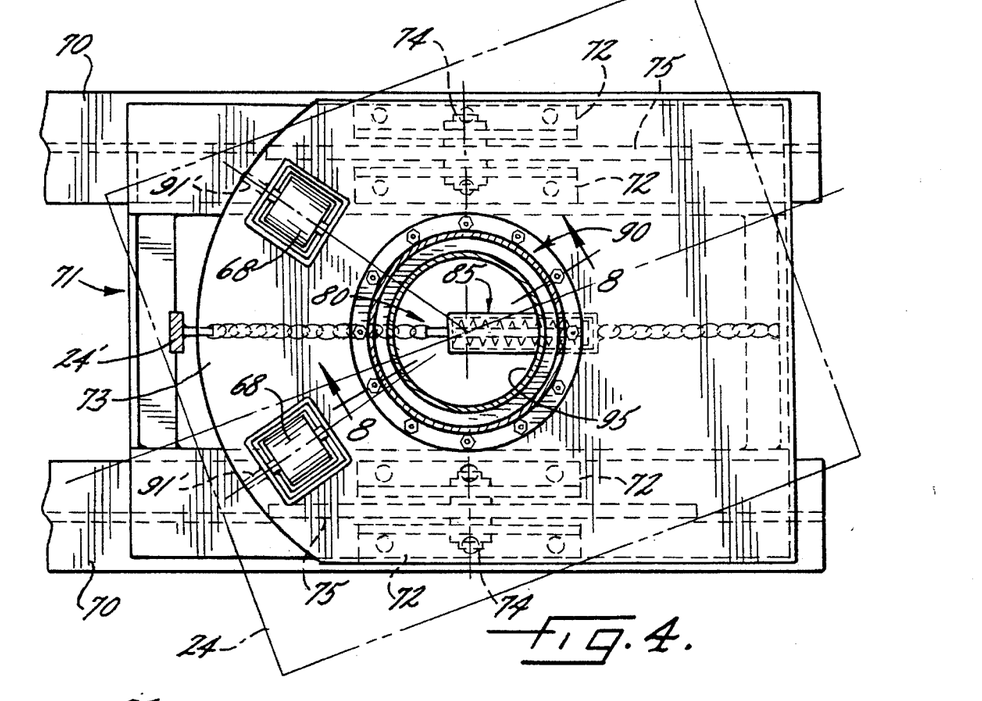
FIG. 4 is a top view of the pivot support structure taken along line 4—4 of FIG. 2.
Figure 8:
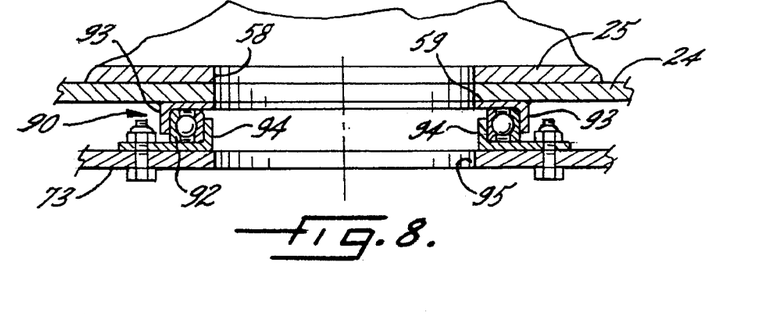
FIG. 8 is a view of the rotational member taken along line 8—8 of FIG. 4.

Pivot plate 73 is connected to rotational frame mounting plate 24 through rotating pivoting member 90, shown most clearly in FIGS. 4 and 5. Rotational bearing member 90, as shown in FIG. 8, comprises bearing cage 92, having inner and outer races and bearings disposed in rotating relationship between plates 73 and 24. The bearing case 92 is maintained in position by inner track bracket 94 affixed to the top side of plate 73, and outer track bracket 93 affixed to the under side of plate 24. There is an opening 95 in pivot plate 73 to accommodate the hydraulic lines 56, 56'. The opening 95 is disposed directly in line with openings 58, 59. The rotational bearing member 90 is positioned forwardly or rearwardly from the front of the rotational mounting plate to provide the desired balance (forward or rearward tilt of the cutter head assembly 10). For example, if bearing member 90 is located slightly forward of the center of the rectangular frame support then the delimbing cuts are smoother because the alignment arms line up easier.

Figure 6:
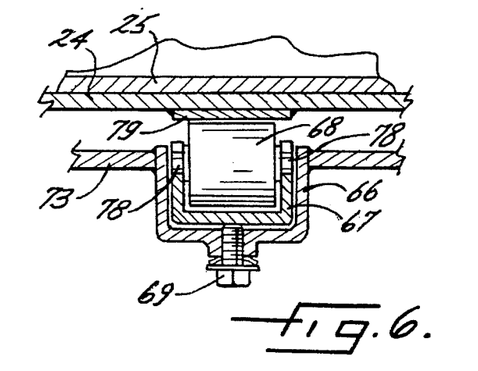
FIG. 6 is a cross-section view of the support roller assembly of this invention taken along line 6—6 of FIG. 2.
Figure 7:
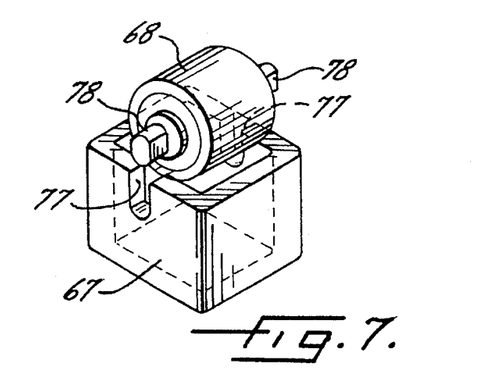
FIG. 7 is a perspective view of the roller support assembly of the present invention.

To aid the rotational movement of the cutter head assembly when it is level, rollers are provided. In FIGS. 6 and 7 there is shown a roller assembly having support cups 66, roller cup 67, roller bearing 68, spring loaded adjustment screw 69, bearing holder slot 77, bearing axle 78, and arcuate roller bearing track 79.

Figure 9:
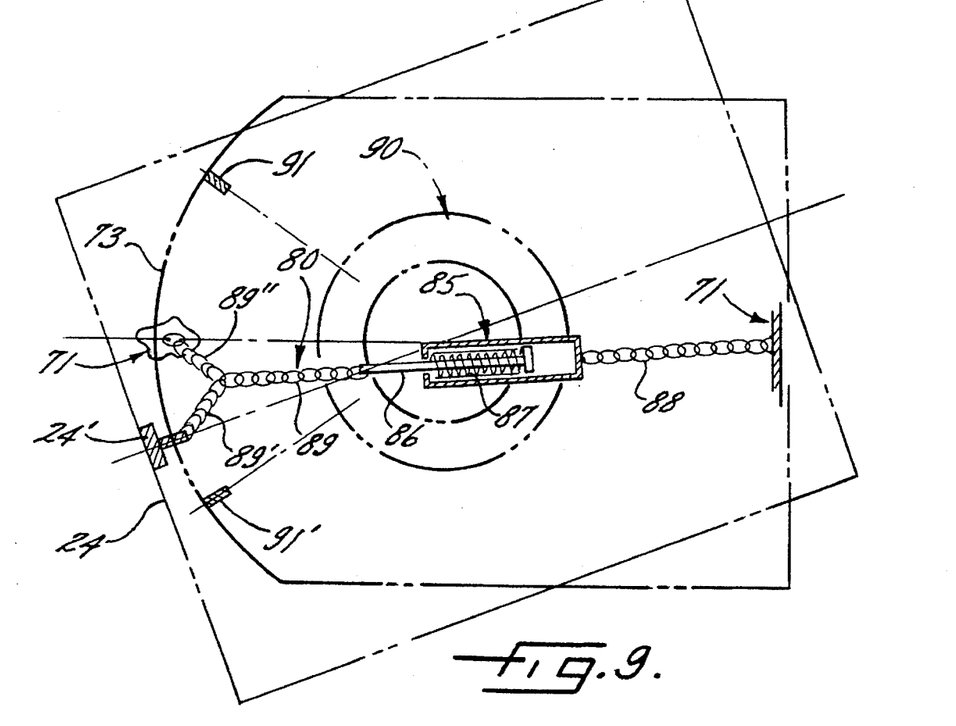
FIG. 9 is a top view of the self-aligning means in extended position.
Figure 10:
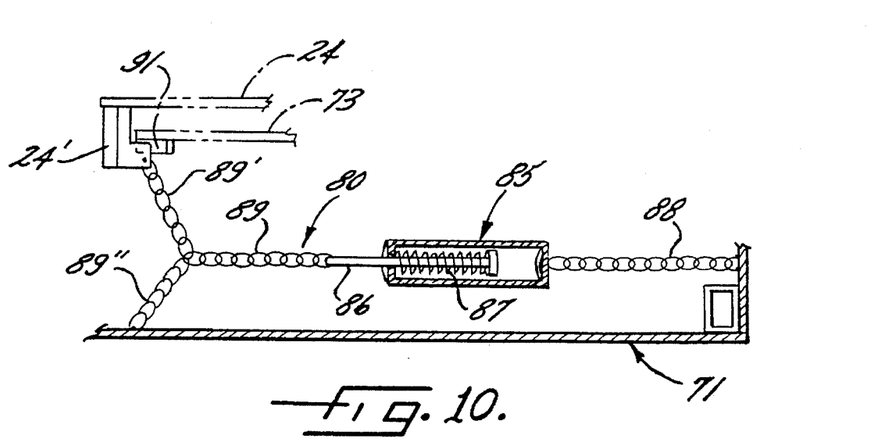
FIG. 10 is a side view of the self-aligning means in extended position.

Rotational movement of cutter head assembly 10 is restricted by chain assembly 80 shown most clearly in FIGS. 9 and 10. Chain assembly 80 comprises a first or forward section of chain 88 attached to depending frame structure 71 at its forward end and to spring housing 85 at its rearward end. Spring housing 85 comprises spring 87 located in the housing and having a rearwardly extending rod 86 therefrom. A second or rear section of chain 89 extends rearwardly from the outer end of rod 86. Chain section 89 at its rear end divides into two sections, section 89' and section 89". Chain section 89' is attached at its rear end to depending bracket 24' extending downwardly from the center of the rear end of rotational frame mounting plate 24. The rotation of the cutter head assembly is also restricted to rotation to the right or the left of between 30° and 39° by stop members 91, 91' which prevent the chain assembly from overextending and thereby breaking. Chain section 89" is attached to the rear portion of the bottom of depending frame structure 71.

As shown in FIG. 1 there are provided substantially inverted U-shaped guide bars 82, 83 have their lower ends fixed on the rectangular support frame and extend upwardly beside and adjacent the respective cutting and limb stripping levers 30, 30' and the guide levers 35, 35'. These guide bars 82, 83 are used to aid in guiding the tree bole into the proper position for delimbing, in the manner described hereafter. The inner surfaces of the medial portions of the vertical legs of the guide bar 82 are provided with inwardly extending cam surfaces 84 for further aiding in guiding the tree bole into the proper position for encircling engagement by the curved cutting and stripping levers 30, 30' and the guide levers 35, 35'.

Figures 11, 12:
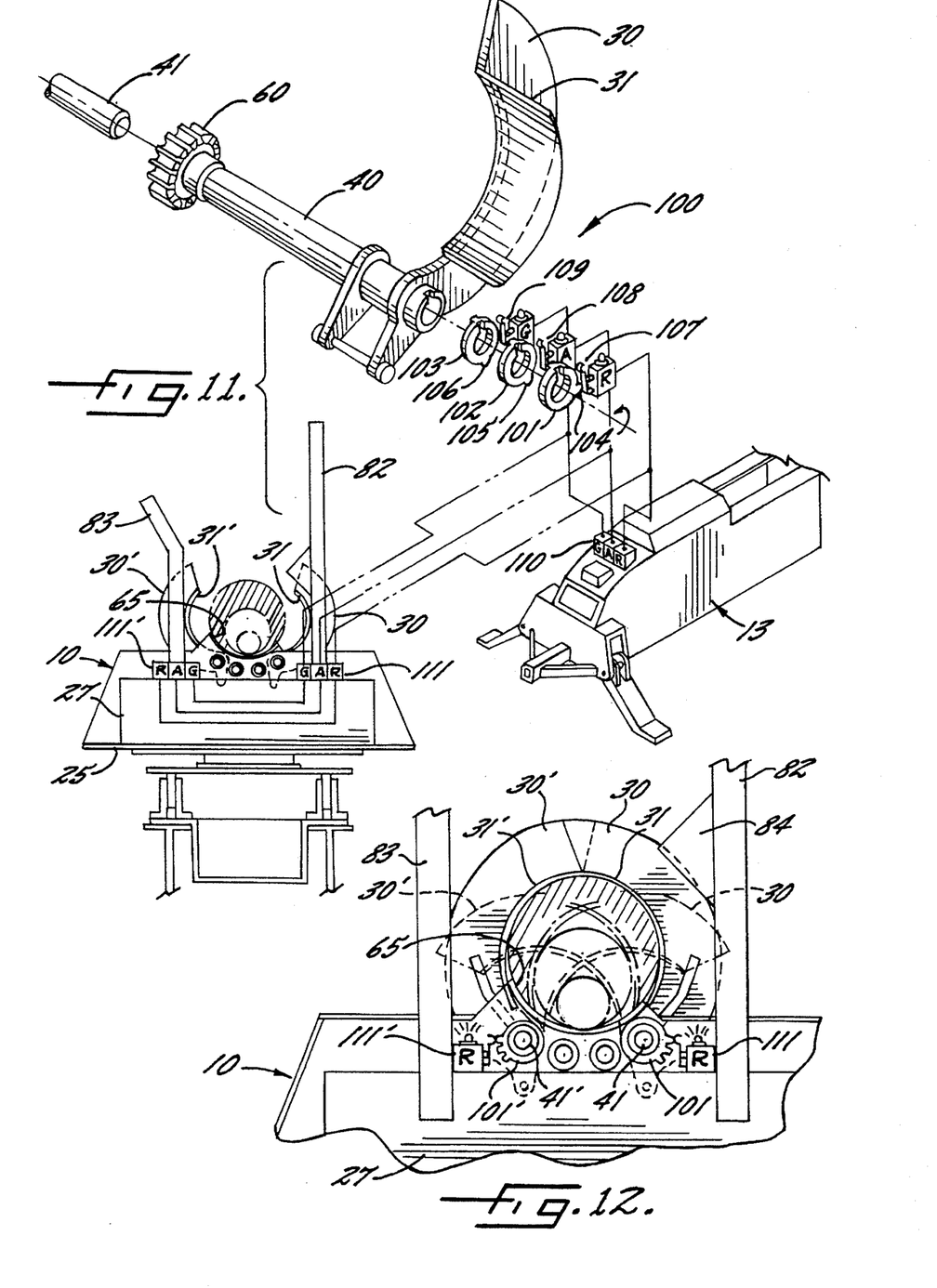
FIG. 11 is an exploded perspective view and partial plan view of the bole diameter measuring assembly of the present invention.
FIG. 12 is an end view illustrating the limb stripping levers and the diameter measuring cams.

An additional feature of the present invention is the provision of a tree bole measuring assembly 100 shown most clearly in FIGS. 11 and 12. A series of cams 101, 102, 103 and 101', 102', 103' are located on tubular shafts 40, 40', respectively, as shown in FIG. 12. When viewing FIG. 11 showing right side stripping lever 30, it should be noted that left side stripping lever 30' has a similar cam arrangement. Each of the cams has a lobe 104, 105, 106 and 104', 105' and 106' on its periphery. The cams are placed on tubular shafts 40, 40' so that as the shafts rotate to close arms 30 and 30', the cam lobes will contact microswitches 107, 108, 109 and 107' (microswitches 108' and 109' are not shown) indicating the various diameters of the tree bole, for example, 12", 8' and 4". Microswitches 107, 108, 109 are placed adjacent to the cams and made contact as the lobe passes. The microswitches are wired to at least one of light bars 110, 111, 111' which indicates by flashing of different colored lights the measurements of the bole of the tree. The cams can be positioned to measure the bole of any diameter.

The improved support frame pivot support of the present invention insures that the curved cutting and limb stripping blades and the curved guide levers are automatically maintained in alignment with the longitudinal axis of the tree trunk as it is pulled through the cutter head by the knuckle boom loader operator so that the tree limbs are quickly and efficiently removed from the tree bole. This self-alignment feature of the cutter head permits the use of the tree delimbing device by a knuckle boom operator with very little experience since it is not necessary that the operator pull the tree bole through the tree delimbing device along a particular path of travel.

MODE OF OPERATION

In the normal tree harvesting operation, the trees are felled, usually with a chain saw, and then the limbs are cut from the trunk or bole of the tree in a position where the tree is felled, again by a manually operated chain saw. This manual delimbing operation adds to the cost of harvesting the trees because it requires additional time on the part of the person cutting the trees. The trees are then dragged or skidded to a loading location to be either cut in the desired length and loaded on a truck or they are loaded in full tree length condition by a knuckle boom loader or the like. By employing the self-aligning cutter head assembly 10 of the present invention, it is no longer necessary for the tree cutter to also carry out the delimbing operation and the trees are felled and skidded to the knuckle boom loader 12 with the limbs remaining thereon.

The knuckle boom loader operator operates the hydraulic valve to actuate and move the piston rods inwardly of the hydraulic cylinders 51 so that both the curved cutting and limb stripping levers 30, 30' and the guide levers 35, 35' are separated and moved outwardly to the open position with the interconnecting gears insuring that the levers are moved outwardly in a uniform manner. The operator then picks up a tree to be delimbed by the grapple 16 engaging the butt end portion of the tree. The tree is lifted to a position above the level of the self-aligning cutter head assembly 10 and the butt end is then lowered into position in engagement with the curved cutting levers 30, 30' and guide levers 35, 35'.

When the butt end portion of the tree is positioned in the cutter head assembly 10, the cutter head assembly will pivot in both the vertical and horizontal positions to be automatically aligned with the longitudinal axis of the tree. The operator then releases the hydraulic pressure on the hydraulic cylinders 51 so that the tension springs 45 move the cutting and limb stripping levers 30, 30' and the guide levers 35, 35' inwardly in a uniform manner on opposite sides of the tree bole to encircle and resiliently engage the outer diameter of the tree. The operator of the knuckle boom loader then draws the tree through the cutter head assembly by moving the grapple 16 away from the cutter head assembly 10 and the blades 31, 31' and 65 engage and strip any outwardly extending limbs from the tree trunk while the guide levers 35, 35' automatically maintain the cutter head assembly 10 aligned with the longitudinal axis of the tree to prevent the blades from digging into the tree and jamming the cutter blades. Thus, the operator does not have to be concerned with moving the grapple 16 along a predetermined path but can simply pull the tree through the cutter head assembly without requiring any particular skill. The cutter head assembly 10 pivots in both the vertical and horizontal planes an amount sufficient to automatically remain in longitudinal alignment with the tree trunk by virtue of chain assembly 85 causing the cutter head assembly 10 to automatically return to alignment when it has been rotated out of alignment. After delimbing the tree bole is either placed on a trailer for transport or it may be moved to a cutting cradle to be cut into predetermined lengths.

It should be noted that the curved cutting and limb stripping levers 30, 30' are initially moved in and resiliently held in encircling relationship with the full size tree bole. As the bole is drawn through the cutter head assembly 10 from the butt end to the top end, the diameter of the tree trunk gradually reduces and the curved cutting and limb stripping levers 30, 30' are moved inwardly and resiliently maintained in engagement therewith by the springs 45 until the tree bole is reduced in diameter to approximately three inches.

In operation, as the tree passes the cutting blade 31, the blade rests against the tree bole and consequently the appropriate portion of the cam corresponding to that diameter causes the light to be indicated on the light bar. For example, a diameter of 12" or higher may be indicated by a red light, from 4" to 8" may be indicated by an amber light and 4" or below may be indicated by a green light. The knuckle boom operator will then manually activate the topping saw when the tree bole reaches the minimum diameter to top the tree. It should be understood, of course, that the topping saw may be automatically activated when the appropriate diameter is reached.

Thus, the knuckle boom loader operator is required to acquire no special skill or training to use the cutter head assembly of the present invention and delimbs the tree by merely positioning the tree in the cutter head assembly and drawing the same therethrough. The limb stripping operation is thus carried out by merely drawing the tree through the cutter head assembly as it is lifted in its normal manner to place the tree on a transporting truck or the like. The limited amount of pivotal movement in both the vertical and horizontal planes by the cutter head assembly thus insures that the curved cutting and limb stripping blades and the curved guide levers are automatically maintained in alignment with the longitudinal axis of the tree trunk as it is moved through the cutter head assembly so that the tree limbs are quickly and efficiently removed therefrom.

The invention has been described in detail with particular reference to preferred embodiments and the operation thereof, but it is understood that variations, modifications, and the substitution of equivalent means can be effected within the spirit of this invention.

What is claimed is:

1. A tree delimbing device with a self-aligning cutter head comprising:

a support frame including a frame assembly having front and rear ends, opposite sides, a bottom, and a depending frame structure;

a pair of curved cutting and limb stripping levers pivotally supported for movement toward and away from each other and adjacent said front end of said support frame, said stripping levers including curved blades fixed thereto and defining a tree encircling cutting opening therebetween for longitudinal movement of a tree in one direction through the cutting opening;

guide means supported adjacent said rear end of said support frame and defining a tree guide opening for axial movement of the tree trunk through the guide opening;

means for supporting said support frame for rotational and pivotal movement; and means for limiting rotational movement of said support frame in the horizontal plane which includes a resilient assembly connected at one end to said support frame and at the other end to said frame assembly for limiting the amount of pivotal movement of said rectangular support frame in the horizontal plane and for returning said support frame to a centered position after completion of a delimbing operation, said support frame, said limb stripping blades and said guide means are maintained in alignment with the longitudinal axis of the tree bole as the tree moves through the respective cutting and guiding means at the respective front and rear ends of said support frame.

2. The tree delimbing device according to claim 1 including resilient means operatively connected to said curved cutting and limb stripping levers and to said curver guide levers to resiliently urge the same inwardly into said tree encircling relationship with the tree bole as it is drawn through the cutter head assembly.

3. The tree delimbing device according to claim 1 wherein said means supporting said support frame for rotational movement includes a base plate supported on a rotating frame mounting plate interconnected to a pivot plate by a rotational bearing member.

4. The tree delimbing device according to claim 1 wherein said vertical pivot movement of the frame support is limited by a vertical stop member.

5. The tree delimbing device according to claim 1 including actuator means connected to said cutting and limb stripping levers and to said guide levers for positively moving the same outwardly to an open position in preparation for receiving a tree bole in said cutter head assembly.

6. The tree delimbing device according to claim 5 wherein said actuator means comprises hydraulic cylinders operatively connecting said limb stripping levers and guide levers and having lines connecting said hydraulic cylinders and a fluid power source, said lines passing through an opening in the bottom of said support frame.

7. The tree delimbing device according to claim 1 wherein said resilient means for limiting rotational movement includes a chain assembly having three chain sections, one section connected at one end of frame assembly depending frame structure and the other end connected to a tension spring, a second chain segment connected at one end to the rear of said spring and one portion of the other end of said chain section connected to the under side of the support frame and the other portion to said means supporting said frame.

8. The tree delimbing device according to claim 1 further comprising a bole diameter measuring assembly comprising a series of cams sized to denote appropriate tree bole diameters located on shafts controlling limb stripping blades, microswitches are provided adjacent to the cams indicating transmitting signal to the light bar.

* * * * *